United States Patent [19]

Lew

[11] Patent Number: 5,076,105

[45] Date of Patent: Dec. 31, 1991

[54] VORTEX FLOWMETER

[76] Inventor: Hyok S. Lew, 7890 Oak St., Arvada, Colo. 80005

[21] Appl. No.: 412,794

[22] Filed: Sep. 26, 1989

[51] Int. Cl.$^5$ .............................................. G01F 1/32
[52] U.S. Cl. ................................................. 73/861.24
[58] Field of Search ........................ 73/861.22, 861.24

[56] References Cited

U.S. PATENT DOCUMENTS

| | | | |
|---|---|---|---|
| 2,809,520 | 10/1957 | Richard, Jr. ...................... | 73/861.24 |
| 3,683,691 | 8/1972 | Kivenson .......................... | 73/861.24 |
| 3,698,245 | 10/1972 | McNabb ............................ | 73/861.24 |
| 3,720,104 | 3/1973 | Zanker ............................. | 73/861.24 |
| 4,069,708 | 1/1978 | Fussell, Jr. ...................... | 73/861.24 |

FOREIGN PATENT DOCUMENTS 0204152  11/1983  Fed. Rep. of Germany ... 73/861.24

*Primary Examiner*—Herbert Goldstein

[57] ABSTRACT

A flowmeter includes a vortex generating bluff body disposed across a flow passage and a vortex sensing planar member disposed downstream of the bluff body across the flow passage parallel to the bluff body and the central axis of the flow passage, wherein the trailing edge of the vortex sensing planar member is connected to a transducer secured to the flowmeter body, which vortex sensing planar member may be connected to or separated from the bluff body. The volume flow rate of fluid is determined from frequency of an alternating electromotive force generated by the transducer and representing an alternating fluid dynamic force experienced by the vortex sensing planar member, and the mass flow rate is determined from a combination of the frequency and amplitude of the alternating electromotive force.

22 Claims, 2 Drawing Sheets

VORTEX FLOWMETER

BACKGROUND OF THE INVENTION

The vortex shedding flowmeter technology provides a unique advantage in bringing forth a new generation flowmeter that measures volume and mass flow rates as well as the fluid density, as the frequency of vortex shedding is proportional to the fluid velocity and the fluid dynamic reaction to the vortex shedding is proportional to the dynamic pressure of the fluid flow that is equal to one half of the fluid density times the squares of the fluid velocity. No other flowmeter technologies employing a single flow sensor provide flow data of dual nature like the vortex shedding flowmeter. There is little doubt that in near future, there will be a very wide spread use of the vortex shedding flowmeter as a three-in-one flowmeter that measures volume flow rate and fluid density. At the present time, there are a few outstanding vortex sensing technologies as well as numerous mundane vortex shedding flowmeter technologies, which are feasible for constructing flowmeters of flow passage diameter greater than three quarters of an inch or larger. There are extensive demands for flowmeters of flow passage diameters less than three quarters of an inch and greater than three sixteenth of an inch in the chemical, pharmaceutical and food processing industries.

BRIEF SUMMARY OF THE INVENTION

The primary object of the present invention is to provide a vortex sensing technology for the construction of vortex sensing flowmeters of small flow passage diameters as well as large flow passage diameters.

Another object is to provide a vortex shedding flowmeter including a vortex shedding bluff body of an elongated cylindrical shape disposed across a cross section of a flow passage in a structurally isolated arrangement from the wall of the flow passage, wherein the bluff body includes a planar support laterally extending therefrom in the downstream direction and anchored to a thin wall of a cavity containing a transducer that converts an alternating lift force generated by the vortex shedding and experienced by the bluff body to an alternating electrical signal.

A further object is to provide a vortex shedding flowmeter comprising a vortex shedding bluff body of an elongated cylindrical shape disposed across a cross section of a flow passage in a structurally isolated arrangement from the wall of the flow passage, wherein the bluff body is supported by a planar support extending therefrom in the downstream direction and secured to the wall of the flow passage at a downstream extremity of the planar support, and the bluff body or the planar support is connected to a force receiving member extending from a thin wall of a cavity containing a transducer.

Yet another object is to provide a vortex shedding flowmeter comprising a vortex shedding bluff body of an elongated cylindrical shape disposed across a first cross section of a flow passage and secured to the wall of the flow passage, and a vortex sensing planar member disposed across a second cross section of the flow passage downstream of the bluff body in a structurally isolated arrangement from the wall of the flow passage, wherein the downstream edge of the planar member is affixed to a thin wall of a cavity containing a transtransducer.

Yet a further object is to provide a vortex shedding flowmeter comprising a vortex generating bluff body of an elongated cylindrical shape disposed across a first cross section of a flow passage and secured to the wall of the flow passage; a pair of vortex sensing planar members disposed downstream of the bluff body respectively in the two opposite sides of a plane including the central axis of the flow passage and perpendicular to the bluff body in a structurally isolated arrangement from the wall of the flow passage, wherein each of the pair of the vortex sensing planar members is anchored at the downstream edge thereof to a thin wall of a cavity containing a transducer, in which arrangement the leading edges of the two vortex sensing planar members are off-set from one another by a distance equal to a no-ninteger times the wave length of sinuating streamlines created by vortices shed from the vortex generating bluff body.

These and other objects of the present invention will become clear as the description thereof progresses.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
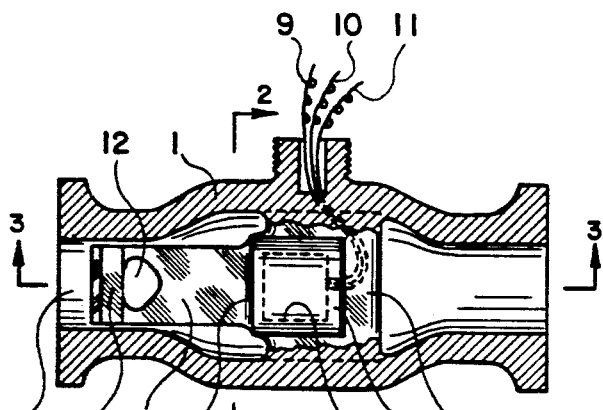
FIG. 1 illustates a cross section of an embodiment of the vortex shedding flowmeter comprising a vortex generator-sensor.

In FIG. 1 there is illustrated a cross section of an embodiment of the vortex shedding flowmeter including a vortex generator-sensor, which is constructed in accordance with the principles of the present invention. The flowmeter body 1 includes a flow passage 2 extending therethrough. A vortex generating bluff body 3 of an elongated cylindrical shape is disposed across a cross section of the flow passage 2 in a structurally isolated arrangement from the wall of the flow passage 2. The bluff body 3 is supported by a planar support member 4 extending from the trailing edge of the bluff body in the downstream direction parallel to the central axis of the flow passage 2 and affixed to a thin wall 5 of a cavity 6 included in a transducer container vessel 7 that contains transducer elements. The transducer container vessel 7 of a circular cylindrical shape is rigidly secured to a pylon 8 having a streamlined cross section that extends across another cross section of the flow passage 2 downstream of the bluff body and anchored to the flowmeter body. The electrical wires 9, 10 and 11 extending from the transducer elements contained in the transducer container vessel 7 are routed through a conduit included in the pylon 8 and extending to the exterior region outside the flowmeter body 1. The flow passage 1 is enlarged around the transducer container vessel 7 in order to compensate the flow blockage created by the transducer container vessel 7 that is disposed in the central portion of the cross section of the flow passage 2. The planar support member 4 includes an opening 12 disposed therethrough adjacent to the trailing edge of the bluff body 3, whereby the fluctuating fluid dynamic pressures at the two opposite cylindrical sides of the bluff body are allowed to communicate in order to enhance the vortex shedding from the bluff body in a clear and regular pattern. Instead of a large single opening 12, a plurality of small openings may be disposed through the planar support member 4 following the trailing edge of the bluff body 3.

Figure 2:
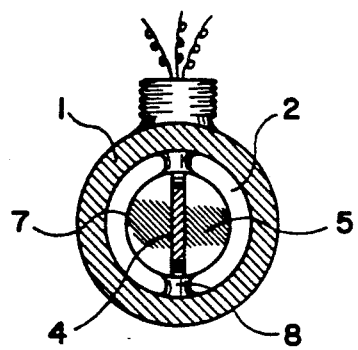
FIG. 2 illustrates another cross section of the embodiment shown in FIG. 1.

In FIG. 2 there is illustrated another cross section of the embodiment shown in FIG. 1, which cross section is taken along plane 2—2 as shown in FIG. 1. The planar support member 4 extends from the thin end wall 5 of the transducer container vessel 7 that is secured to the pylon 8 extending across the enlarged portion of the flow passage 2 and anchored to the flowmeter body 1. It should be noticed that the planar support member 4 is disposed on a plane including the central axis of the cylindrical cavity 6 included in the transducer container vessel 7 that contains the transducer element.

Figure 3:
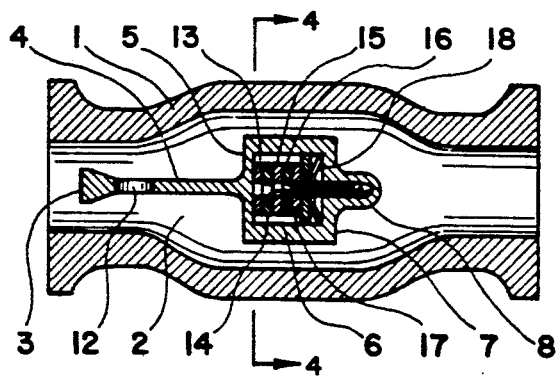
FIG. 3 illustrates a further cross section of the embodiment shown in FIG. 1.

In FIG. 3 there is illustrated a further cross section of the embodiment shown in FIG. 1, which cross section is taken along plane 3—3 as shown in FIG. 1. The bluff body 3 supported by the planar support member 4 extending from the thin end wall 5 of the transducer container vessel 7 has a blunt leading edge. The cross sectional dimension of the bluff body 3 in a direction perpendicular to a plane including the planar support member 4 must not be less than the thickness of the planar support member 4. The circular cylindrical cavity 6 included in the transducer container vessel 7 houses a combination of stacked transducer elements comprising an insulator disc 13, an electrode disc 14, a Piezo electric disc 15, an electrode disc 16, and an insulator disc 17, which combination of stacked transducer elements are pressed against the thin end wall 5 by a spring washer 18 as shown in the particular embodiment or by a rigid back-up disc threadedly compressing the combination of the transducer elements against the thin end wall 5. The fluid dynamic reaction of the vortex shedding from the two opposite cylindrical sides of the bluff body 3 in an alternating pattern generates an alternating lift force on the combination of the bluff body 3 and the planar support member 4, that alternatively compresses and decompresses the two halves of the Piezo electric disc 15 respectively located on the two opposite sides of a plane including the planar support member 4. As a consequence, the fluid dynamic reaction to the vortex shedding generates an alternating electromotive force from the transducer assembly wherein the frequency thereof is proportional to the fluid velocity and the amplitude is linearly or nonlinearly proportional to the dynamic pressure of the fluid flow, that is equal to one half of the fluid density times the square of the fluid velocity. Once the relationship between the frequency of the transducer output signal and the fluid velocity, and the relationship between the amplitude of the transducer output signal and the dynamic pressure of the fluid flow are empirically determined by calibrating the flowmeter, the volume flow and mass flow rates are respectively determined from the frequency and a combination of the frequency and amplitude of the alternating electrical signal generated by the vortices shed from the bluff body. The density of the fluid is determined as a ratio of the mass flow rate to the volume flow rate.

Figure 4:
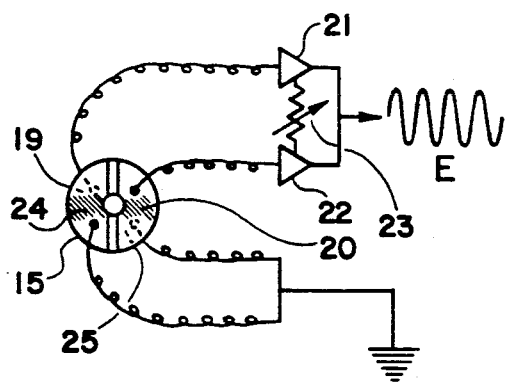
FIG. 4 illustrates a plan view of an embodiment of the Piezo electric element included in the transducer container supporting the vortex generator-sensor and the electronic circuitry refining signals from the transducer assembly.

In FIG. 4 there is illustrated a plan view of an embodiment of the Piezo electric disc 15 included in the transducer assembly contained in the transducer container vessel 7 shown in FIG. 3, which plan view is taken along plane 4—4 as shown in FIG. 3, as well as an electronic circuitry refining the electrical signals generated by the transducer assembly. The circular Piezo electric disc 15 of uniform polarization has two sets of split electrodes respectively disposed on the two opposite sides of the Piezo electric disc 15. The first two semicircular electrodes 19 and 20 respectively disposed on the two opposite sides of the Piezo electric element 15 on two opposite sides of the plane including the planar support member 4 are respectively connected to two amplifiers 21 and 22, which amplifiers 21 and 22 have a signal balancing means 23 therebetween such as one or a pair of variable resistors. The second two semicircular electrodes 24 and 25 respectively disposed on the two opposite sides of the Piezo electric element 15 on two opposite sides of the plane including the planar support member 4 are grounded. The alternating lift force generated by the vortex shedding and experienced by the combination of the bluff body 3 and the planar support member 4 alternatively compresses and decompresses the two halves of the Piezo electric disc 15 and generates electromotive forces of opposite signs from the two halves of the Piezo electric disc 15. Since the amplifiers 21 and 22 are connected to the two semicircular electrodes 19 and 20 respectively disposed on the two opposite sides of the Piezo electric disc 15 on the two opposite sides of the plane including the planar support member 4, the electromotive force supplied to the amplifiers 21 and 22 from the two semicircular electrodes 19 and 20 have the same sign, which are added to one another after amplification by the amplifiers 21 and 22. The structural vibration of the flowmeter body in directions parallel to the planar support member 4 do not generate any net output signal because the two electromotive forces resulting from these structural vibrations respectively supplied from the two semicircular electrodes 19 and 20 have opposite signs and become canceled between the two amplifiers 21 and 22 as the signal balancing means 23 is set to cancel these vibration noises. As a consequence, the resultant electromotive force E supplied by the combination of the transducer and electronic circuitry shown in FIG. 4 provides electrical signals mostly generated by the vortex shedding. The fluid velocity or volume flow rate is determined from the frequency of the alternating electromotive force E and the mass flow rate is determined from a combination of the frequency and amplitude of the alternating electromotive force E. It should be mentioned that the shape of the electrodes may take any geometry as long as they are split along the plane including the planar support member 4.

Figure 5:
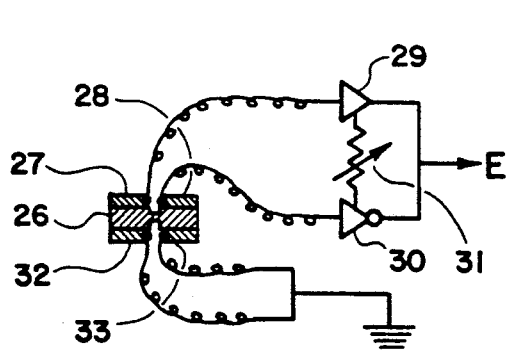
FIG. 5 illustrates a cross section of another embodiment of the Piezo electric element included in the transducer container supporting the vortex generator-sensor and the electronic circuitry refining signals from the transducer assembly.

In FIG. 5 there is illustrated a cross section of another embodiment of the combination of stacked transducer elements, that can be packaged into the cavity of the transducer container vessel 7 included in the embodiment shown in FIG. 3, which cross section is taken along a plane including the planar support member 4 shown in FIG. 3. Each side of the Piezo electric disc 26 has a pair of electrodes split from one another along the plane including the planar support member 4 shown in FIG. 3. The two electrodes 27 and 28 disposed on one side of the Piezo electric disc 26 are respectively connected to a noninverting amplifier 29 and an inverting amplifier 30. The vibration noise signals are canceled between the two amplifiers 29 and 30 by means of the signal balancing means 31 such as one or a pair of variable resistors balancing the level of signal outputs between the two amplifiers. The electrodes 32 and 33 disposed on the other side of the Piezo electric disc 26 are grounded. It is not difficult to realize that, when the combination of the stacked transducer elements shown in FIG. 5 is split along the plane including the planar support member 4 shown in FIG. 3 and one of the two split halves is turned over, the inverting amplifier 30 can be replaced by another noninverting amplifier like the amplifier 29, wherein the same electronic circuitry as that shown in FIG. 5 refines the electrical signal.

Figure 6:
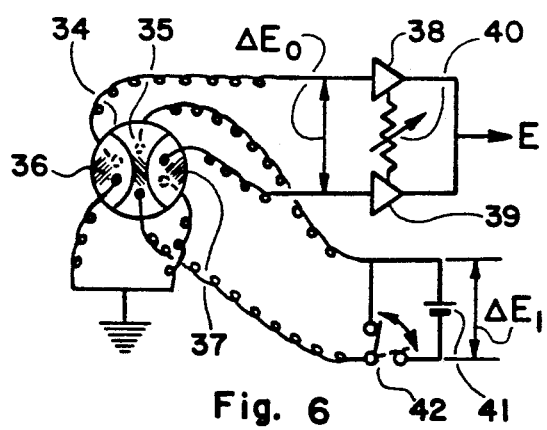
FIG. 6 illustrates a further embodiment of the Piezo electric element included in the transducer container supporting the vortex generator-sensor and the electric circuitry refining signals from the transducer assembly.

In FIG. 6 there is illustrated a plan view of a further embodiment of the Piezo electric disc usable in place of the Piezo electric disc 15 included in the embodiment shown in FIG. 3. Each side of the Piezo electric element 34 has a middle electrode 35 straddling the plane including the planar support member 4 shown in FIG. 3 and two side electrodes 36 and 37 separated by the middle electrode 35. The side electrodes are connected to the pair of amplifiers 38 and 39 with signal balancing means 40, or grounded by the same electrical circuits as those shown in FIG. 4. The two middle electrodes respectively disposed on the two opposite sides of the Piezo electric disc 34 are connected to the two opposing terminals of a test electromotive force source 41 of potential difference $\Delta E_I$ thereacross. When the switch 42 is momentarily closed, the test source 41 supplies an input electrical pulse $\Delta E_I$ across the two middle electrodes respectively disposed on the two opposite sides of the Piezo electric disc 34, which input electrical pulse produces a mechanical impulse on the Piezo electric disc 34 and generates an output electrical pulse $\Delta E_O$ across the two side electrodes respectively connected to the two amplifiers 38 and 39. The ratio of the input electrical pulse to the output electrical pulse, e.g. $\Delta E_I/\Delta E_O$ provides a calibration standard which can be used to determine the amplitude of the alternating fluid dynamic force generated by the vortex shedding from the amplitude of the alternating electrical signal E provided by the two amplifiers 38 and 39 arranged in a parallel combination. In other words, the ratio of $\Delta E_I/\Delta E_O$ obtained intermittently on a real time basis to $\Delta E_I/\Delta E_O$ initially obtained at the time of calibration of the flowmeter provides a calibration basis that accurately determines the amplitude of the alternating fluid dynamic force when that ratio is multiplied to the proportionality coefficient obtained during the initial calibration of the flowmeter, that converts the amplitude of the alternating electrical signal E to the amplitude of the alternating fluid dynamic force generated by the vortex shedding. The transducer assembly and the electronic circuitry shown in FIG. 6 provides a self-calibrating transducer that eliminates error in determining the amplitude of the alternating fluid dynamic force generated by the vortex shedding from the amplitude of the alternating electrical signal generated by the transducer supporting the combination of the bluff body 3 and the planar support member 4.

Figure 7:
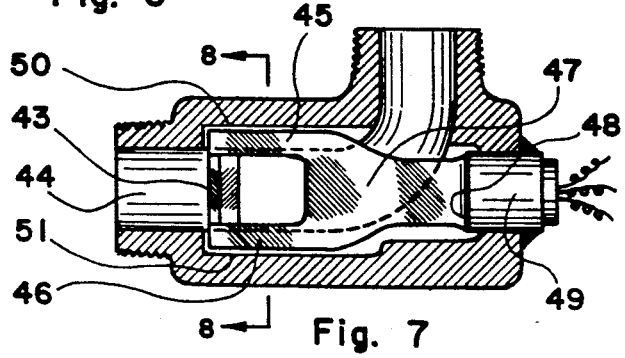
FIG. 7 illustrates a cross section of another embodiment of the vortex shedding flowmeter comprising a vortex generator-sensor.

In FIG. 7 there is illustrated a cross section of another embodiment of the vortex shedding flowmeter comprising a vortex generator-sensor. The vortex generating bluff body 43 disposed across a flow passage 44 in a structurally isolated arrangement from the wall of the flow passage 44 is supported at the two extremities thereof by a pair of forked extremities 45 and 46 of a planar support member 47 extending from the thin end wall 48 of the transducer container vessel 49 having the same construction as that shown in and described in conjunction with FIG. 3. The two forked extremities 45 and 46 of the planar support member 47 are respectively disposed in two grooves 50 and 51 axially disposed in two diametrically opposite portions of the flow passage wall. In this particular embodiment, the downstream half of the flow passage is angled by 90 degrees from the upstream half thereof, which arrangement demonstrates the feasibility of packaging the principles of the present invention into a flowmeter with an angled flow passages. Of course, the combination including the bluff body 43, the forked planar support member 47 and the transducer 49 can be readily incorporated into a flowmeter with a straight flow passage as shown in FIGS. 1-3.

Figure 8:
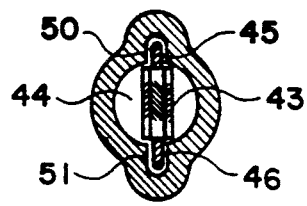
FIG. 8 illustrates another cross section of the embodiment shown in FIG. 7.

In FIG. 8 there is illustrated another cross section of the embodiment shown in FIG. 7, which cross section is taken along plane 8—8 as shown in FIG. 7. The two forked extremities 45 and 46 respectively affixed to the two extremities of the bluff body 43 are disposed within a pair of axial grooves 50 and 51 included in the wall of the flow passage 44.

Figure 9:
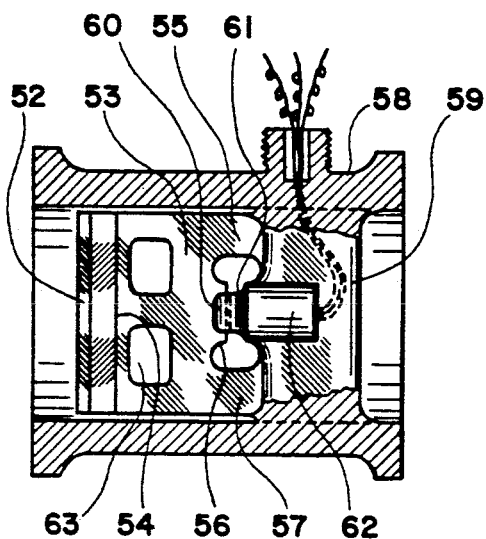
FIG. 9 illustrates a cross section of a further embodiment of the vortex shedding flowmeter comprising a vortex generator-sensor.

In FIG. 9 there is illustrated a cross section of a further embodiment of the vortex shedding flowmeter comprising a vortex generator-sensor. The vortex generating bluff body 52 disposed across the flow passage in a structurally isolated arrangement from the flow passage wall is supported by a planar support member 53 extending from the trailing edge 54 of the bluff body. The downstream edge of the planar support member 53 is divided into three forked extremities 55, 56 and 57, wherein the two forked extremities 55 and 57 adjacent to the flow passage wall are anchored to the flowmeter body 58 by means of a pylon structure 59 disposed across the flow passage, while the middle forked extremity 56 is mechanically coupled to a force receiving member 60 extending from the thin end wall 61 of the transducer container vessel 62 including the transducer elements as shown in FIG. 3, that is disposed coaxially to the flow passage and secured to the pylon structure 59. The electrical wires extending from the transducer 62 is routed through a conduit included in the pylon structure 59 and extending through the wall of the flow passage. The planar support member 53 includes one or more pressure communicating openings 63 disposed therethrough adjacent to the trailing edge 54 of the bluff body 52.

Figure 10:
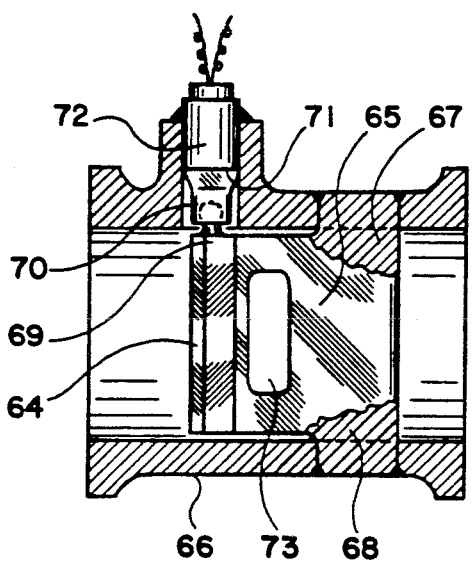
FIG. 10 illustrates a cross section of yet another embodiment of the vortex shedding flowmeter comprising a vortex generator-sensor.

In FIG. 10 there is illustrated a cross section of yet another embodiment of the vortex shedding flowmeter comprising a vortex generator-sensor. The vortex generating bluff body 64 disposed across the flow passage in a structurally isolated arrangement from the wall of the flow passage is supported by a planar support member 65 extending from the trailing edge thereof. The downstream half of the planar support member 65 is secured to the flowmeter body 66 at the two opposite extremities 67 and 68 thereof. One extremity 69 of the bluff body 64 is mechanically coupled to a force receiving member 70 extending from the thin end wall 71 of the transducer container vessel 72 including the transducer elements as shown in FIG. 3. The planar support member 65 includes a pressure communicating opening 73 disposed therethrough adjacent to the trailing edge of the bluff body 64.

Figure 11:
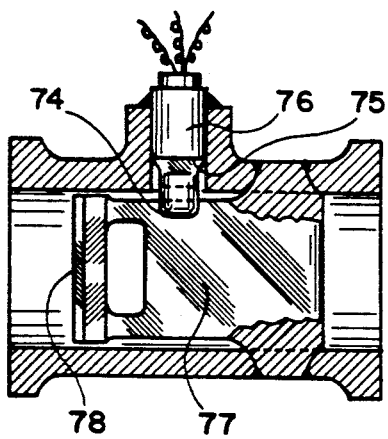
FIG. 11 illustrates a cross section of yet a further embodiment of the vortex shedding flowmeter comprising a vortex generator-sensor.

In FIG. 11 there is illustrated a cross section of yet a further embodiment of the vortex shedding flowmeter including a vortex generator-sensor, that has essentially the same construction as the embodiment shown in FIG. 10 with one exception, which exception is the force receiving member 74 extending from the thin wall 75 of the transducer container vessel 76 that is now mechanically coupled to one side edge of the planar support member 77 extending from the trailing edge of the bluff body 78. In all embodiments of the vortex shedding flowmeter with a bluff body supported by the planar support member extending from the trailing edge of the bluff body, the optimum length thereof measured along the central axis of the flow passage must be determined empirically to obtain the maximum vortex shedding signal, wherein the fluid dynamic force associated with the vortex shedding and experienced by the combination of the bluff body and the planar support member becomes a harmonically alternating signal with maximum amplitude.

Figure 12:
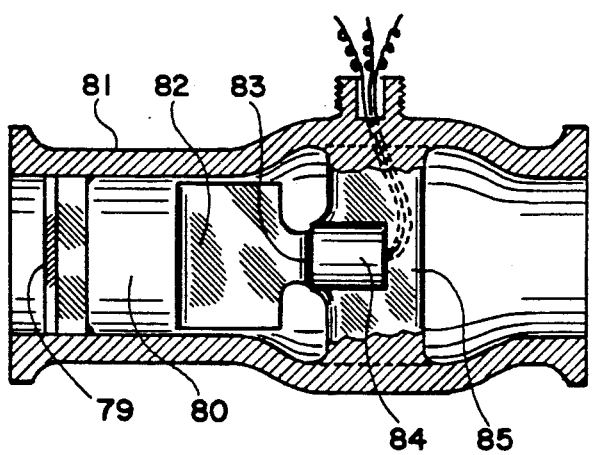
FIG. 12 illustrates a cross section of an embodiment of the vortex shedding flowmeter comprising a vortex generating bluff body and a vortex sensing planar member disposed downstream of the vortex generating bluff body.

In FIG. 12 there is illustrated a cross section of an embodiment of the vortex shedding flowmeter including separate vortex generator and vortex sensor. The vortex generating bluff body 79 of an elongated cylindrical shape is disposed across a first cross section of the flow passage 80 and secured to the flowmeter body 81 at one or both extremities thereof. A vortex sensing planar member 82 extending from the thin-end wall 83 of the transducer container vessel 84 is disposed across a second cross section of the flow passage generally parallel to the bluff body 79 on a plane generally parallel to the central axis of the flow passage 80, which vortex sensing planar member does not touch the wall of the flow passage. The transducer container vessel 84 including the transducer elements as shown in FIG. 3 is secured to a pylon structure 85 that is disposed across the enlarged section of the flow passage and affixed to the flowmeter body. The electrical wires originating from the transducer are routed through a conduit included in the pylon structure 85 and extending through the wall of the flow passage. The operating principles of the vortex shedding flowmeter shown in FIG. 12 are the same as those described in conjunction with FIGS. 3 and 4.

Figure 13:
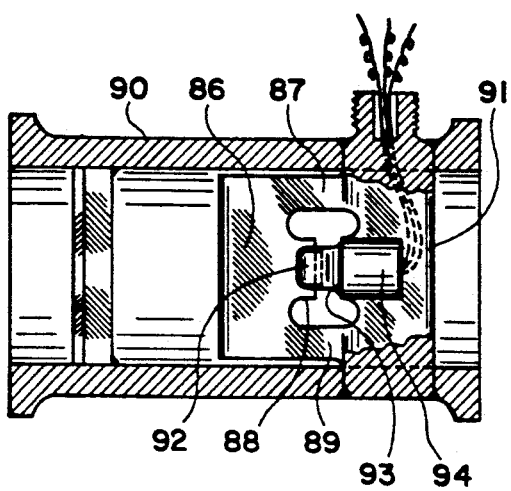
FIG. 13 illustrates a cross section of another embodiment of the vortex shedding flowmeter comprising a vortex generating bluff body and a vortex sensing planar member disposed downstream of the bluff body.

In FIG. 13 there is illustrated a cross section of another embodiment of the vortex shedding flowmeter comprising separate vortex generator and vortex sensor, which has essentially the same construction as the embodiment shown in FIG. 12 with one exception, that is the trailing edge of the vortex sensing planar member 86 having three forked extremities 87, 88 and 89. The two forked extremities 87 and 89 adjacent to the flow passage wall are secured to the flowmeter body 90 by means of the pylon structure 91 disposed across the flow passage and affixed to the flowmeter body 90 at the two extremities thereof. The force receiving member 92 extending from the thin end wall 93 of the transducer container vessel 94 is mechanically coupled to the middle forked extremity 88 of the trailing edge of the vortex sensing planar member 86, while the transducer container vessel 94 is secured to the pylon structure 91. The electrical wires originating from the transducer are routed through a conduit included in the pylon structure and extending through the flow passage wall.

Figure 14:
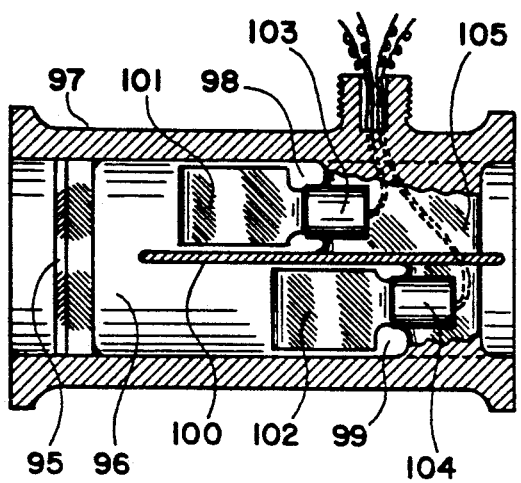
FIG. 14 illustrates a cross section of an embodiment of the vortex shedding flowmeter comprising a vortex generating bluff body and a pair of vortex sensing planar members disposed downstream of the bluff body in a side-by-side arrangement.

In FIG. 14 there is illustrated a cross section of an embodiment of the vortex shedding flowmeter comprising a vortex generator and a pair of vortex sensors disposed in a side-by-side arrangement. The vortex generating bluff body 75 of an elongated cylindrical shape is disposed across the flow passage 96 and secured to the flowmeter body 97 at one or both extremities thereof. The downstream portion of the flow passage 96 from the bluff body 95 is divided into two parallel flow passages 98 and 99 by a divider plate 100 disposed across the flow passage perpendicular to the bluff body 95 on a plane including the central axis of the flow passage 96. A pair of vortex sensing planar members 101 and 102 respectively extending from the transducer container vessels 103 and 104 are disposed in the two downstream flow passages 98 and 99 in a parallel relationship to the bluff body 95 and the central axis of the flow passage 96. The transducer container vessels 103 and 104 are secured to the pylon structure 105 disposed across both downstream flow passages 98 and 99 through the divider plate 100 and secured to the flowmeter body at both extremities thereof. The electrical wires originating from the transducers are routed through a conduit included in the pylon structure 105 and extending through the wall of the flow passage 96. The leading edges of the two vortex sensing planar members 101 and 102 are off-set from one another by a distance equal to a noninteger times the wave length of the sinuating streamlines created by vortices shed from the bluff body, whereby the vortex signals respectively detected by the two transducers 103 and 104 are out of phase by 180 degrees, while the noise signals are in phase between the two transducers, whereby the signals from the two transducers 103 and 104 are combined in such a way that the vortex signals add up and noise signals cancel therebetween. The most desirable off-set distance between the leading edges of the two vortex sensing planar members 101 and 102 is one half wave length of the sinuating streamlines. The vortex shedding flowmeter shown in FIG. 14 operates on the same principles as those described in conjunction with FIGS. 3 and 4.

It should be understood that the embodiments shown in FIGS. 1, 7, 9, 10, 11, 12, 13 and 14 also work with other types of transducers such as those employing strain gauge, optical fiber, magnetic pick-up coil, etc. even though they work best with a Piezo electric type transducer. It should be mentioned that the vortex shedding flowmeters shown in FIGS. 1, 7, 9, 10, 11, 12, 13 and 14 work as an in-line flowmeter as well as an insertion type flowmeter wherein the embodiments shown are supported by an elongated support member for inserting the flowmeter of a small port diameter into the midstream of a large diameter flow passage.

While the principles of the present invention have now been made clear by the illustrative embodiments, there will be many modifications of structures, arrangements, proportions, elements and materials immediately obvious to those skilled in the art, which are particularly adapted to the specific working environments and operating conditions in the practice of the invention without departing from those principles. It is not desired to limit the inventions to the particular illustrative embodiments shown and described and, accordingly, all suitable modifications and equivalents may be resorted to falling within the scope of the inventions as defined by the claims which follow.

The embodiments of the invention in which an exclusive property or priviledge is claimed, are defined as follows:

1. An apparatus for measuring flow rate of fluid comprising in combination:
    (a) a body including a flow passage extending therethrough;
    (b) a vortex generating bluff body of an elongated cylindrical shape disposed across the flow passage in a structurally isolated arrangement from the wall of the flow passage;
    (c) a planar support member extending from the bluff body in a direction generally parallel to the central axis of the flow passage; and
    (d) a transducer means connected to at least a portion of the extremity of the planar support member opposite to the bluff body, said transducer means secured to a structure extending from the wall of the flow passage and including at least one piezo electric element contained in a cavity of a transducer container vessel and pressed against a thin wall of said cavity, wherein the planar support member is connected to said thin wall of said cavity;
wherein said transducer means provides an alternating electromotive force representing an alternating fluid dynamic force generated by vortices shed from the bluff body and experienced by the combination of the bluff body and the planar support member as a measure of flow rate of fluid moving through the flow passage.

2. A combination as set forth in claim 1 wherein volume flow rate of the fluid is determined from frequency of said alternating electromotive force.

3. A combination as set forth in claim 1 wherein mass flow rate of the fluid is determined from a combination of frequency and amplitude of said alternating electromotive force.

4. A combination as set forth in claim 3 wherein said combination includes a means for exerting an input electrical pulse of known amplitude across said piezo electric element and means for measuring an output electrical pulse from said piezo electric element generated by said input electrical pulse, wherein the ratio of amplitude of the input electrical pulse to the amplitude of the output electrical pulse is used as a calibration standard in determining the amplitude of said alternating fluid dynamic force from the amplitude of said alternating electromotive force.

5. An apparatus for measuring flow rate of fluid comprising in combination:
    (a) a body including a flow passage extending therethrough;
    (b) a vortex generating bluff body of an elongated cylindrical shape disposed across the flow passage in a structurally isolated arrangement from the wall of the flow passage;
    (c) a planar support member extending from the bluff body in a direction generally parallel to the central axis of the flow passage, said planar support member including at least one opening disposed therethrough adjacent to the trailing edge of the bluff body for providing fluid pressure communication between two cylindrical sides of the bluff body; and
    (d) a transducer means connected to at least a portion of the extremity of the planar support member opposite to the bluff body, said transducer means secured to a structure extending from the wall of the flow passage;
wherein said transducer means provides an alternating electromotive force representing an alternating fluid dynamic force generated by vortices shed from the bluff body and experienced by the combination of the bluff body and the planar support member as a measure of flow rate of fluid moving through the flow passage.

6. A combination as set forth in claim 5 wherein volume flow rate of the fluid is determined from frequency of said alternating electromotive force.

7. A combination as set forth in claim 5 wherein mass flow rate of the fluid is determined from a combination of frequency and amplitude of said alternating electromotive force.

8. An apparatus for measuring flow rate of fluid comprising in combination:
    (a) a body including a flow passage extending therethrough;
    (b) a vortex generating bluff body of an elongated cylindrical shape disposed across the flow passage in a structurally isolated arrangement from the wall of the flow passage;
    (c) a planar support member extending from the bluff body in a direction generally parallel to the central axis of the flow passage, wherein trailing edge portion of the planar support member is secured to the body; and
    (d) a transducer means connected to a deflective portion of the combination of the bluff body and the planar support member, said transducer means secured to the wall of the flow passage and including at least one piezo electric element contained in a cavity of a transducer container vessel and pressed against a thin wall of said cavity, wherein the combination of the bluff body and the planar support member is connected to said thin wall of said cavity
wherein said transducer means provides an alternating electromotive force representing an alternating fluid dynamic force generated by vortices shed from the bluff body and experienced by the combination of the bluff body and the planar support member as a measure of flow rate of fluid moving through the flow passage.

9. A combination as set forth in claim 8 wherein volume flow rate of the fluid is determined from frequency of said alternating electromotive force.

10. A combination as set forth in claim 8 wherein mass flow rate of the fluid is determined from a combination of frequency and amplitude of said alternating electromotive force.

11. A combination as set forth in claim 10 wherein said combination includes a means for exerting an input electrical pulse of known amplitude across said piezo electric element and means for measuring an output electrical pulse from said piezo electric element generated by said input electrical pulse, wherein the ratio of amplitude of the input electrical pulse to the amplitude of the output electrical pulse is used as a calibration standard in determining the amplitude of said alternating fluid dynamic force from the amplitude of said alternating electromotive force.

12. A combination as set forth in claim 8 wherein the transducer means is connected to one extremity of the bluff body by a mechanical coupling.

13. A combination as set forth in claim 8 wherein the transducer means is connected to one side edge of the planar support member adjacent to the wall of the flow passage by a mechanical coupling.

14. An apparatus for measuring flow rate of fluid comprising in combination:
(a) a body including a flow passage extending therethrough;
(b) a vortex generating bluff body of an elongated cylindrical shape disposed across the flow passage in a structurally isolated arrangement from the wall of the flow passage;
(c) a planar support member extending from the bluff body in a direction generally parallel to the central axis of the flow passage and including at least one opening disposed therethrough adjacent to the trailing edge of the bluff body for providing fluid pressure communication between two cylindrical sides of the bluff body, wherein trailing edge portion of the planar support member is secured to body; and
(d) a transducer means connected to a deflective portion of the combination of the bluff body and the planar support member, said transducer means secured to the wall of the flow passage;
wherein said transducer means provides an alternating electromotive force representing an alternating fluid dynamic force generated by vortices shed from the bluff body and experienced by the combination of the bluff body and the plannar support member as a measure of flow rate of fluid moving through the flow passage.

15. A combination as set forth in claim 14 wherein volume flow rate of the fluid is determined from frequency of said alternating electromotive force.

16. A combination as set forth in claim 14 wherein mass flow rate of the fluid is determined from a combination of frequency and amplitude of said alternating electromotive force.

17. A combination as set forth in claim 14 wherein the transducer means is connected to one extremity of the bluff body by a mechanical coupling.

18. A combination as set forth in claim 14 wherein the transducer means is connected to one side edge of the planar support member adjacent to the wall of the flow passage by a mechanical coupling.

19. An apparatus for measuring flow rate of fluid comprising in combination:
(a) a body including a flow passage extending therethrough;
(b) a vortex generating bluff body of an elongated cylindrical shape disposed across first cross section of the flow passage and secured to the body;
(c) a vortex sensing planar member disposed across a second cross section of the flow passage generally parallel to the bluff body on a plane generally parallel to the central axis of the flow passage; and
(d) a transducer means connected to at least a portion of the traling edge of the vortex sensing planar member, said transducer means secured to a structure extending from the wall of the flow passage and including at least one piezo electric element contained in a cavity of a transducer container vessel and pressed against a thin wall of said cavity, wherein the vortex sensing planar member is connected to said thin wall of said cavity;
wherein said transducer means provides an alternating electromotive force representing an alternating fluid dynamic force generated by vortices shed from the bluff body and experienced by the vortex sensing planar member as a measure of flow rate of fluid moving through the flow passage.

20. A combination as set forth in claim 19 wherein volume flow rate of the fluid is determined from frequency of said alternating electromotive force.

21. A combination as set forth in claim 19 wherein mass flow rate of the fluid is determined from a combination of frequency and amplitude of said alternating electromotive force.

22. A combination as set forth in claim 21 wherein said combination includes a means for exerting an input electrical pulse of known amplitude across said piezo electric element and means for measuring an output electrical pulse from said piezo electric element generated by said input electrical pulse, wherein the ratio of amplitude of the input electrical pulse to the amplitude of the output electrical pulse is used as a calibration standard in determining the amplitude of said alternating fluid dynamic force from the amplitude of said alternating electromotive force.

* * * * *